US011634576B2

(12) United States Patent
Arai et al.

(10) Patent No.: US 11,634,576 B2
(45) Date of Patent: Apr. 25, 2023

(54) POLYACETAL RESIN COMPOSITION

(71) Applicant: Polyplastics Co., Ltd., Tokyo (JP)

(72) Inventors: Hiroki Arai, Shizuoka (JP); Tomohiro Monma, Shizuoka (JP)

(73) Assignee: POLYPLASTICS CO., LTD., Tokyo (JP)

( * ) Notice: Subject to any disclaimer, the term of this patent is extended or adjusted under 35 U.S.C. 154(b) by 0 days.

(21) Appl. No.: 17/051,919

(22) PCT Filed: Apr. 24, 2019

(86) PCT No.: PCT/JP2019/017403
§ 371 (c)(1),
(2) Date: Oct. 30, 2020

(87) PCT Pub. No.: WO2019/244477
PCT Pub. Date: Dec. 26, 2019

(65) Prior Publication Data
US 2021/0095112 A1  Apr. 1, 2021

(30) Foreign Application Priority Data

Jun. 19, 2018 (JP) .............................. JP2018-115737

(51) Int. Cl.
| | | |
|---|---|---|
| *C08L 59/04* | (2006.01) | |
| *C08K 3/22* | (2006.01) | |
| *C08K 5/00* | (2006.01) | |
| *C08K 5/13* | (2006.01) | |
| *C08L 71/02* | (2006.01) | |
| *F02M 59/44* | (2006.01) | |

(52) U.S. Cl.
CPC ............... *C08L 59/04* (2013.01); *C08K 3/22* (2013.01); *C08K 5/005* (2013.01); *C08K 5/13* (2013.01); *C08L 71/02* (2013.01); *F02M 59/445* (2013.01); *C08K 2003/222* (2013.01); *F02M 2200/9015* (2013.01)

(58) Field of Classification Search
None
See application file for complete search history.

(56) References Cited

U.S. PATENT DOCUMENTS

| | | | | |
|---|---|---|---|---|
| 5,478,895 | A * | 12/1995 | Sugiyama ................. | C08K 3/22 524/424 |
| 7,247,665 | B1 | 7/2007 | Woerner et al. | |
| 10,174,270 | B1 * | 1/2019 | Kanda .................... | C10M 107/06 |
| 10,844,191 | B2 * | 11/2020 | Arai ........................ | C08L 59/00 |
| 2005/0020770 | A1 * | 1/2005 | Kim ...................... | C08K 5/1345 524/877 |
| 2007/0073007 | A1 | 3/2007 | Harashina | |
| 2007/0179231 | A1 * | 8/2007 | Sonobe .................... | C08K 3/26 524/318 |
| 2008/0200639 | A1 * | 8/2008 | Harashina ............... | C08L 59/00 528/332 |
| 2008/0271381 | A1 * | 11/2008 | Harashina ............... | C08K 5/34 51/298 |
| 2009/0143508 | A1 | 6/2009 | Bessho et al. | |
| 2010/0056676 | A1 | 3/2010 | Hase | |
| 2010/0280156 | A1 | 11/2010 | Hase | |
| 2013/0324675 | A1 * | 12/2013 | Luo ........................ | C08L 83/08 525/398 |
| 2015/0166768 | A1 * | 6/2015 | Shimoda ................ | C08K 5/098 524/101 |
| 2015/0259520 | A1 | 9/2015 | Kobayashi et al. | |
| 2016/0251509 | A1 | 9/2016 | Shimoda et al. | |
| 2017/0204247 | A1 | 7/2017 | Shimoda et al. | |
| 2017/0327682 | A1 | 11/2017 | Okut et al. | |
| 2020/0172699 | A1 | 6/2020 | Arai et al. | |

FOREIGN PATENT DOCUMENTS

| | | | |
|---|---|---|---|
| CN | 1103414 A | 12/1997 | |
| CN | 1561369 A | 4/2005 | |
| CN | 101891871 A | 11/2010 | |
| CN | 101910302 A | 12/2010 | |
| EP | 0580872 A1 * | 2/1994 | ............... C08K 5/05 |
| EP | 2546301 A1 | 1/2013 | |
| EP | 3604437 A1 | 2/2020 | |
| JP | H 07-286023 A | 10/1995 | |
| JP | 2000-017144 A | 1/2000 | |
| JP | 2001-072830 A | 3/2001 | |
| JP | 2003-509521 A | 3/2003 | |
| JP | 2004-204193 A | 7/2004 | |
| JP | 2005-503477 A | 2/2005 | |
| JP | 2008-126523 A | 6/2008 | |

(Continued)

OTHER PUBLICATIONS https://www.knowde.com/stores/sanyo-chemical-industries/products/sanyo-chemical-peg-6000s/, Mar. 2022 (Year: 2022).*
https://www.sanyo-chemical.co.jp/eng/wp/wp-content/uploads/2021/04/No7_e.pdf#page=14, Mar. 2022 (Year: 2022).*
https://www.sanyo-chemical.co.jp/eng/wp/wp-content/uploads/2019/11/no02.pdf?msclkid=198fc1c6ab8011ec94a146b0bc2c2bfa, Mar. 2022 (Year: 2022).*
https://www.knowde.com/stores/sanyo-chemical-industries/products/sanyo-chemical-peg-6000s/?msclkid=ae86acb1ab8011ecba9c183ee27b0092, Mar. 2022 (Year: 2022).*
Notice of Reasons for Rejection issued to JP Application No. 2018-115737, dated Dec. 3, 2019.
Notice of Decision to Grant a Patent issued to JP Application No. 2018-115737, dated Mar. 31, 2020.
Final Office Action issued in related U.S. Appl. No. 16/487,679, dated Jul. 27, 2020.

(Continued)

*Primary Examiner* — Satya B Sastri
(74) *Attorney, Agent, or Firm* — Knobbe, Martens, Olson & Bear LLP

(57) ABSTRACT

A polyacetal resin composition capable of minimizing degradation when a molded body thereof comes into contact with an acidic cleaner. The polyacetal resin composition contains with respect to (A) 100 parts by mass of a polyacetal copolymer in which the amount of a hemiformal end group is 0.8 mmol/kg or less, (B) more than 1.0 parts by mass and at most 5.0 parts by mass of a hindered phenol-based antioxidant, and (C) more than 4.0 parts by mass and at most 30 parts by mass of magnesium oxide.

6 Claims, No Drawings

(56) References Cited

FOREIGN PATENT DOCUMENTS

| | | |
|---|---|---|
| JP | 2008-127556 A | 6/2008 |
| JP | 2009-132768 A | 6/2009 |
| JP | 2012-233121 A | 11/2012 |
| JP | 2008-001850 A | 8/2013 |
| JP | 2015-034221 A | 2/2015 |
| JP | 2015-110714 A | 6/2015 |
| JP | 5814419 B1 | 11/2015 |
| JP | 2016-011398 A | 1/2016 |
| JP | 6046482 B2 | 12/2016 |
| KR | 10-2006-0130034 A | 12/2006 |
| MX | 2019011466 A | 11/2019 |
| WO | WO 1995/023171 A1 | 8/1995 |
| WO | WO 2003/027177 A2 | 4/2003 |
| WO | WO 2006/098251 A1 | 9/2006 |
| WO | WO 2008/001556 A1 | 1/2008 |
| WO | WO 2014/119392 A1 | 8/2014 |
| WO | WO 2016/104255 A1 | 6/2016 |
| WO | WO 2018/180078 A1 | 10/2018 |

OTHER PUBLICATIONS

Notice of Reasons for Rejection in Japanese Patent Application No. 2017-069783, dated Jul. 10, 2018.

Office Action issued in Chinese Patent Application No. 201880006558.7, dated Jul. 30, 2021.

Office Action issued in Korean Patent Application No. 10-2019-7019473, dated Oct. 30, 2019.

Office Action issued in the related U.S. Appl. No. 16/487,679, dated Apr. 15, 2020.

\* cited by examiner

POLYACETAL RESIN COMPOSITION

This application is the U.S. National Phase under 35 U.S.C. § 371 of International Application PCT/JP2019/017403, filed Apr. 24, 2019, designating the U.S., and published in Japanese as WO 2019/244477 on Dec. 26, 2019 which claims priority to Japanese Patent Application No. 2018-115737, filed Jun. 19, 2018, the entire content of which is incorporated herein by reference.

TECHNICAL FIELD

The present invention relates to a polyacetal resin composition having high resistance against acidic components.

BACKGROUND ART

Since polyacetal resins have excellent chemical resistance, molded products formed of a polyacetal resin as a raw material have been widely used for automobile components. For example, they have been used for large components such as fuel delivery units, representative examples of which are fuel contact bodies, such as fuel pump modules, which are directly in contact with fuel oil.

In recent years, sulfur reduction of fuels has progressed in order to respond to environmental regulations in various countries. However, since desulfurization equipment is highly costly, high sulfur-containing fuels are still being distributed in some countries. These high sulfur-containing fuels have a tendency to readily degrade polyacetal resins compared to low sulfur-containing fuels.

In response to these problems, the Applicant of the present application reported that formulating an oxide of alkali earth metal, polyalkylene glycol and a specific ester into a polyacetal resin results in significant improvement (Patent Document 1). In particular, a significant improving means was obtained for components of fuel delivery units or the like, which were in contact with high sulfur-containing fuels. Additionally, a technique using a hindered phenol-based antioxidant and a hindered amine-based stabilizer in combination has also been proposed (Patent Document 2).

Patent Document 1: Japanese Patent No. 5814419
Patent Document 2: Japanese Patent No. 6046482

DISCLOSURE OF THE INVENTION

Problems to be Solved by the Invention

Although automobile components such as fuel delivery units are covered with a casing such as a hood, splashes of cleaner may sometimes adhere during car washing. In particular, when removing brake dust or the like attached to a wheel, strongly acidic cleaners, which are more acidic than high sulfur-containing fuels, may be used. Such cleaners are capable of degrading automobile components formed of polyacetal resins and this is also a serious problem. Additionally, generation of mold deposits during molding and lack of retention of long-term heat resistance of molded products would be also the problem.

An object of the present invention is to provide a polyacetal resin composition which can suppress a molded product formed thereof from being degraded when the product is in contact with an acidic cleaner. Another object is to provide an acid-resistant polyacetal resin composition which generates only a small amount of mold deposits and which has high productivity. Further, another object is to provide an acid-resistant polyacetal resin composition which also has long-term heat resistance.

Means for Solving the Problems

The present inventors have undertaken diligent research and have found that the above-mentioned problems can be solved by setting the composition of a polyacetal resin composition to a specified one.

Conventionally, formulating an excessive amount of alkaline earth metal oxide in a polyacetal resin promotes decomposition of unstable ends in the polyacetal resin, and this results in unfavorable effects on the mechanical properties, moldability or the like (Patent Document 1). The present inventors have found that upon reducing the content of a specific end group in a polyacetal resin to a given value or less and adjusting the polyacetal resin composition so as to contain a specific metal compound and an antioxidant in specific amounts, the above-mentioned unfavorable effects can be reduced to a substantially non-problematic extent and acid resistance can be remarkably improved, and the present inventors have completed the present invention.

Namely, the present invention relates to: In a first aspect of the present invention, provided is a polyacetal resin composition, including: (A) a polyacetal copolymer in an amount of 100 parts by mass, in which the polyacetal copolymer (A) has a hemiformal end group content of 0.8 mmol/kg or less, (B) a hindered phenol-based antioxidant in an amount of more than 1.0 part by mass and 5.0 parts by mass or less, and (C) magnesium oxide in an amount of more than 4.0 parts by mass and 30 parts by mass or less. In a second aspect of the present invention, provided is the polyacetal resin composition as described in the first aspect, including 0.5 to 10 parts by mass of (D) a polyalkylene glycol. In a third aspect of the present invention, provided is an automotive part or motorcycle part including a molded product of the polyacetal resin composition as described in the first or second aspect. In a fourth aspect of the present invention, provided is the automotive part or motorcycle part as described in the third aspect, in which the automotive part or motorcycle part is a part to be brought into contact with an acidic cleaner. In a fifth aspect of the present invention, provided is a method for improving acid resistance against an acid component, in which the method comprises using the molded product of the polyacetal resin composition as described in the first or second aspect. In a sixth aspect of the present invention, provided is the method as described in the fifth aspect, in which the acid component is derived from an acidic cleaner.

Effects of the Invention

According to the present invention, it is possible to provide a polyacetal resin composition which can minimize degradation of a molded product produced of the polyacetal resin composition when the molded product is in contact with an acidic cleaner. Incidentally, the term "acidic cleaner" refers to a cleaner having a pH of 6 or less, optionally 2 or less, and examples thereof include a wheel cleaner, etc. Additionally, according to the present invention, it is possible to suppress generation of mold deposits and moreover, long-term heat resistance is also excellent.

PREFERRED MODE FOR CARRYING OUT THE INVENTION

Below, specific embodiments of the present invention are explained in detail, but the present invention is not in any way limited to the below embodiments, and within the scope of the objective of the present invention, suitable modifications may be implemented.

Polyacetal Resin Composition

The polyacetal resin composition of the present invention is characterized by including: polyacetal copolymer (A) in an amount of 100 parts by mass, wherein the polyacetal copolymer (A) has a hemiformal end group content of 0.8 mmol/kg or less, hindered phenol-based antioxidant (B) in an amount of more than 1.0 part by mass and 5.0 parts by mass or less, and magnesium oxide (C) in an amount of more than 4.0 parts by mass and 30 parts by mass or less.

Polyacetal Copolymer (A)

In the present invention, polyacetal copolymer (A) having a specific end characteristic is used as a base resin. The polyacetal copolymer is a resin having an oxymethylene group ($-OCH_2-$) as a main structural unit as well as another comonomer unit other than the oxymethylene group and is typically manufactured by copolymerizing formaldehyde or a cyclic oligomer of formaldehyde as a main monomer with a compound selected from a cyclic ether or cyclic formal as a comonomer. Generally, unstable parts at the end are removed by hydrolysis.

In particular, as the main monomer, trioxane, a cyclic trimer of formaldehyde, is commonly used. Trioxane is generally obtained by reacting an aqueous formaldehyde solution in the presence of an acidic catalyst. This is purified by a method such as distillation and is used. Trioxane used for polymerization preferably contains as little as possible impurities, such as water, methanol, formic acid and the like, as is described below.

Examples of the cyclic ethers and cyclic formals as the comonomer include ethylene oxide, propylene oxide, butylene oxide, cyclohexene oxide, oxetane, tetrahydrofuran, trioxepane, 1,3-dioxane, 1,3-dioxolane, propylene glycol formal, diethylene glycol formal, triethylene glycol formal, 1,4-butanediol formal, 1,6-hexanediol formal, etc.

In addition, compounds capable of forming branched or cross-linked structures may be used as the comonomer (or a termonomer). Examples of such compounds include alkyl or aryl glycidyl ethers such as methyl glycidyl ether, ethyl glycidyl ether, butyl glycidyl ether, 2-ethyl-hexyl glycidyl ether, phenyl glycidyl ether, etc.; and diglycidyl ethers of alkylene glycols or polyalkylene glycols, such as ethylene glycol diglycidyl ether, triethylene glycol diglycidyl ether, butanediol diglycidyl ether, etc. These comonomers may be used alone or in combination of two or more.

The polyacetal copolymer as described above may be generally obtained by adding an appropriate amount of a molecular weight regulator and performing cationic polymerization using a cationic polymerization catalyst. Usable molecular weight regulators, cationic polymerization catalysts, polymerization methods, polymerization apparatuses, deactivation processes of catalysts after polymerization, end stabilization treatments of crude polyacetal copolymers obtained by polymerization, or the like, are known from many documents, and basically any of them may be used.

The molecular weight of the polyacetal copolymer to be used in the present invention is not particularly limited, and it is preferable that the weight average molecular weight is about 10,000 to 400,000. It is preferable that the melt index (measured at 190° C. under a load of 2.16 kg according to ASTM-D1238) serving as an index of fluidity of the resin is 0.1 to 100 g/10 min., and more preferably 0.5 to 80 g/10 min.

The polyacetal copolymer (A) to be used in the present invention needs to have a specific end characteristic as described above. Specifically, it is essential that the hemiformal end group content is 0.8 mmol/kg or less.

Here, the hemiformal end group is represented by $-OCH_2OH$ and the content of such hemiformal end group may be determined by $^1H$-NMR measurement. As to the concrete measurement method, reference may be made to a method disclosed in Japanese Unexamined Patent Application, Publication No. 2001-11143.

When polyacetal copolymer (A) to be used does not have the above-mentioned end characteristic and the end content exceeds the upper limit value, it is not possible to obtain a polyacetal resin composition which can satisfactorily reduce the generation amount of formaldehyde. Further, it is difficult to maintain the generation amount of formaldehyde due to repeated thermal history at a low level.

In this case, generation of mold deposits during molding is excessively large, and this results in a problem in molding. In addition, generation of formaldehyde promotes generation of voids in the molded product and may cause a problem in mechanical properties.

From such a viewpoint of maintaining moldability while maintaining acid resistance, polyacetal copolymer (A) to be used in the present invention preferably has a hemiformal end group content of 0.6 mmol/kg or less, more preferably 0.4 mmol/kg or less. The lower limit of the hemiformal end group content is not particularly limited.

As described above, polyacetal polymer (A) having a specific end characteristic may be produced by, for instance, reducing impurities contained in the monomer and the comonomer, selecting the production process or optimizing the production conditions thereof.

Specific examples of the method for producing polyacetal polymer (A) having the specific end characteristic satisfying the requirements of the present invention are given below, but the method is not limited to this method.

First, it is important to reduce amounts of active impurities generating unstable ends in the polymerization system, specifically, impurities such as water, alcohols (e.g., methanol) or acids (e.g., formic acid) contained in the monomer and comonomer.

An excessively high content of this is, of course, not preferable for obtaining a polyacetal polymer having a small amount of unstable end portion. Note that a chain transfer agent which does not generate an unstable end, for example, a low molecular weight linear acetal having alkoxy groups at both ends, such as methylal, may be contained in an arbitrary amount to control the molecular weight of the polyacetal polymer.

Next, an amount of catalyst to be used in the polymerization reaction is also the most important factor. An excessive amount of catalyst makes it difficult to properly control polymerization temperatures, and the decomposition reaction during the polymerization becomes dominant, resulting in difficulty in obtaining a polyacetal polymer which satisfies the requirements of the present invention, namely a polyacetal polymer having a small content of unstable end portion. On the other hand, an overly small amount of catalyst may result in decrease in polymerization reaction rate or reduced polymerization yield, which is not preferable.

As the polymerization method, any method known in the art is possible, and a continuous bulk polymerization method, in which liquid monomers are used and a polymer in the form of solid powder mass is obtained as polymerization progresses, is industrially preferable. A polymerization temperature is preferably maintained between 60 to 105° C., in particular, between 65 to 100° C.

When a catalyst comprising boron trifluoride or a coordination compound thereof is used, as the method of deactivating the catalyst after polymerization, a method of adding the polymer after polymerization to an aqueous solution containing a basic compound or the like may be used. In order to obtain the polyacetal polymer satisfying the requirements of the present invention, it is, however, preferable to pulverize and shatter the polymer obtained by the polymerization reaction, so that the polymer is brought into contact with a deactivating agent and the catalyst is quickly deactivated.

For example, it is desirable that the polymer to be subjected to deactivation of catalyst is pulverized and shattered, so that 80% by mass or more, preferably 90% by mass, thereof has a particle diameter of 1.5 mm or less, and 15% by mass or more, preferably 20% by mass or more, thereof has a particle diameter of 0.3 mm or less.

As the basic compound for neutralizing and deactivating the polymerization catalyst, ammonia; amines such as triethylamine, tributylamine, triethanolamine, tributanolamine, etc.; oxides, hydroxides and salts of alkali metals or alkaline earth metals; and other known catalyst-deactivating agents may be used. These basic compounds are preferably added as an aqueous solution of 0.001 to 0.5% by mass, particularly 0.02 to 0.3% by mass.

The temperature of the aqueous solution is preferably 10 to 80° C., and particularly preferably 15 to 60° C. After polymerization is completed, it is preferable to quickly introduce the polymer into an aqueous solution of these to deactivate the catalyst.

The polyacetal polymer having a small content of unstable end may be produced by reducing the impurities contained in the monomer and the comonomer, selecting the production process, optimizing the production conditions thereof, and the like, as described above, and it is possible to further reduce the hemiformal end content by subjecting the polymer to a stabilization step.

As the stabilization step, known methods may be exemplified, such as a method of heating the polyacetal polymer to a temperature equal to or higher than its melting point and treating it in a molten state to decompose and remove only the unstable portion, or a method of conducting a heat treatment at a temperature equal to or higher than 80° C. while maintaining a heterogeneous system in an insoluble liquid medium to decompose and remove only the unstable end portion.

Hindered Phenol-Based Antioxidant (B)

As hindered phenol-based antioxidant (B) to be used in the present invention, the following may be exemplified: 2,2'-methylenebis(4-methyl-6-t-butylphenol), hexamethyleneglycol-bis(3,5-di-t-butyl-4-hydroxyhydrocinnamate), tetrakis[methylene 3(3,5-di-t-butyl-4-hydroxyphenyl)propionate] methane, triethyleneglycol-bis-3-(3-t-butyl-4-hydroxy-5-methylphenyl)propionate, 1,3,5-trimethyl-2,4,6-tris (3,5-di-t-butyl-4-hydroxy-benzyl)benzene, n-octadecyl-3-(4'-hydroxy-3',5'-di-t-butylphenol) propionate, 4,4'-methylenebis(2,6-di-t-butylphenol), 4,4'-butylidene-bis (6-t-butyl-3-methyl-phenol), di-stearyl-3,5-di-t-butyl-4-hydroxybenzylphosphonate, 2-t-butyl-6-(3-t-butyl-5-methyl-2-hydroxybenzyl)-4-methylphenylacrylate, 3,9-bis [2-[3-(3-t-butyl-4-hydroxy-5-methylphenyl)propionyloxy]-1,1-dimethylethyl]-2,4,8,10-tetraoxaspiro[5,5]undecane.

In the present invention, at least one or two or more selected from these antioxidants may be used.

The content of hindered phenol-based antioxidant (B) in the present invention is more than 1.0 to 5.0 part by mass, more preferably 1.1 to 3.0 parts by mass, relative to 100 parts by mass of polyacetal resin (A). In the present invention, the blending amount of antioxidant (B) is considerably higher than the typically used amount and this enables the present invention to ensure sufficient long-term heat resistance, while maintaining the high acidic cleaner-resistance of the present invention.

(C) Magnesium Oxide

Magnesium oxide (C) used in the present invention is preferable because balance between improvement in the cleaner resistance and performances such as mechanical properties or moldability is excellent. With respect to magnesium oxide, magnesium oxide having a BET-specific surface area of 100 $m^2/g$ or more is more preferable. An average particle diameter is 5.0 µm or less, and preferably 1.0 µm or less. The average particle diameter is determined by the particle diameter at a cumulative value of 50% in the particle diameter distribution (volume basis) measured by a laser diffraction/scattering method.

The content of magnesium oxide (C) in the present invention is greater than 4.0 parts by mass and not greater than 30 parts by mass, and preferably 5.0 parts by mass or more and 25 parts by mass or less, relative to 100 parts by mass of polyacetal resin (A).

Conventionally, an increased content of magnesium oxide (C) sometimes promotes decomposition of unstable end in polyacetal resins, but polyacetal copolymer (A) of the present invention can suppress such decomposition, so that characteristics of improvement in acid resistance achieved by increasing the content of magnesium oxide (C) could be found.

Polyalkylene Glycol (D)

In the present invention, it is also preferable that polyalkylene glycol (D) is optionally contained. Although the type of polyalkylene glycol is not particularly limited, from the viewpoint of compatibility with the polyacetal resin, polyalkylene glycol containing polyethylene glycol or polypropylene glycol is preferable, and polyalkylene glycol containing polyethylene glycol is more preferable.

The number average molecular weight (Mn) of the polyalkylene glycol is not particularly limited, but from the viewpoint of dispersibility in the polyacetal resin, it is preferably 1,000 or more and 50,000 or less, and more preferably 5,000 or more and 30,000 or less. In this specification, the number average molecular weight is equivalent to number average molecular weight of polystyrene obtained by size exclusion chromatography (SEC) using tetrahydrofuran (THF) as a solvent.

The content of polyalkylene glycol (D) in the present invention is 0.5 to 10.0 parts by mass, and more preferably 1.0 to 5.0 parts by mass, relative to 100 parts by mass of polyacetal resin (A). When sufficient stress relaxation can be obtained without formulating polyalkylene glycol (D), it is not necessary to formulate polyalkylene glycol (D), but the upper limit of the addition amount is selected in balance with the mechanical properties of the molded product. These may be used by mixing two or more.

Other Components

The polyacetal resin composition of the present invention may contain other components as necessary. As long as the object or effects of the present invention are not inhibited, one or more known stabilizers for polyacetal resin compositions may be added.

Automobile Parts or Motorcycle Parts Comprising Molded Products of Polyacetal Resin Composition The molded product formed of the polyacetal resin composition of the present invention may be used for any automobile part that may by brought into contact with cleaner during washing of an automobile body, such as wheels of the automobile. Moreover, the molded product formed of the polyacetal resin composition of the present invention may be used for any motorcycle part that may be brought into contact with an acidic cleaner.

This molded product can be obtained in a conventional molding method, for example, injection molding, extrusion molding, compression molding, blow molding, vacuum molding, foam molding and rotation molding, by using the above-mentioned polyacetal resin composition. Even when the molded product of the present invention is brought into contact with a strongly acidic cleaner having, for example, pH 2 or less, degradation is suppressed, and good surface appearance of the molded product can be maintained.

EXAMPLES

Below, the present invention is described in detail by the Examples, but the present invention is not limited thereto.
Components of each type in Table 1 are as follows. Units in the table are parts by weight.
Polyacetal Copolymer (A)
A-1: polyacetal copolymer [hemiformal end group content=0.4 mmol/kg, melt index=9 g/10 min.]
A-2: polyacetal copolymer [hemiformal end group content=0.7 mmol/kg, melt index=9 g/10 min.]
A-3: polyacetal copolymer [hemiformal end group content=1.0 mmol/kg, melt index=9 g/10 min.]
Polyacetal copolymers A-1 to A-3 were prepared as described below.
A-1: a mixture of 96.7% by mass of trioxane and 3.3% by mass of 1,3-dioxolane was continuously supplied to a continuous polymerization machine of twin-screw paddle type, and 10 ppm of boron trifluoride was added as a catalyst to carry out polymerization. The mixture of trioxane and 1,3-dioxolane subjected to polymerization contained 4 ppm of water, 2.5 ppm of methanol and 2 ppm of formic acid as impurities.

To the polymer discharged from the discharge port of the polymerization machine, an aqueous solution containing triethylamine in an amount of 1,000 ppm was immediately added, and the polymer was pulverized and stirred to deactivate the catalyst, and then centrifuged and dried to obtain a crude polyoxymethylene copolymer.

Next, this crude polyoxymethylene copolymer was supplied to a twin-screw extruder having a vent port, and a 0.3% triethylamine aqueous solution was added in a content of 0.4% with respect to the crude polyoxymethylene copolymer. The resulting mixture was subjected to melt kneading at a resin temperature of about 220° C., so that the unstable end portion was degraded, and a volatile component containing a degradation product was vaporized off under reduced pressure from the vent port. The polymer withdrawn from the die of the extruder was cooled and shredded to obtain polyacetal copolymer A-1 in the form of pellets, in which the unstable end portion was removed.

A-2: a mixture of 96.7% by mass of trioxane and 3.3% by mass of 1,3-dioxolane was continuously supplied to a continuous polymerization machine of twin-screw paddle type, and 10 ppm of boron trifluoride was added as a catalyst to carry out polymerization. The mixture of trioxane and 1,3-dioxolane subjected to polymerization contained 10 ppm of water, 3.5 ppm of methanol and 5 ppm of formic acid as impurities.

To the polymer discharged from the discharge port of the polymerization machine, an aqueous solution containing triethylamine in a content of 1,000 ppm was immediately added, and the polymer was pulverized and stirred to deactivate the catalyst, and then centrifuged and dried to obtain a crude polyoxymethylene copolymer.

Next, this crude polyoxymethylene copolymer was supplied to a twin-screw extruder having a vent port, a 0.3% triethylamine aqueous solution was added in a content of 0.4% with respect to the crude polyoxymethylene copolymer. The resulting mixture was subjected to melt kneading at a resin temperature of about 220° C., so that the unstable end portion was degraded, and a volatile component containing a degradation product was vaporized off under reduced pressure from the vent port. The polymer withdrawn from the die of the extruder was cooled and shredded to obtain polyacetal copolymer A-2 in the form of pellets, in which the unstable end portion was removed.

A-3: a mixture of 96.7% by mass of trioxane and 3.3% by mass of 1,3-dioxolane was continuously supplied to a continuous polymerization machine of twin-screw paddle type, and 15 ppm of boron trifluoride was added as a catalyst to carry out polymerization. The mixture of trioxane and 1,3-dioxolane subjected to polymerization contained 10 ppm of water, 3.5 ppm of methanol and 5 ppm of formic acid as impurities.

To the polymer discharged from the discharge port of the polymerization machine, an aqueous solution containing triethylamine in a content of 1,000 ppm was immediately added, and the polymer was pulverized and stirred to deactivate the catalyst, and then centrifuged and dried to obtain a crude polyoxymethylene copolymer.

Next, this crude polyoxymethylene copolymer was supplied to a twin-screw extruder having a vent port and subjected to melt kneading at a resin temperature of about 220° C., so that the unstable end portion was degraded, and a volatile component containing a degradation product was vaporized off under reduced pressure from the vent port. The polymer withdrawn from the die of the extruder was cooled and shredded to obtain polyacetal copolymer A-3 in the form of pellets, in which the unstable end portion was removed.
(B) Hindered phenol-based antioxidant
(B-1) Tetrakis [methylene-3-(3,5-di-t-butyl-4-hydroxyphenyl)propionate]methane (product name: Irganox 1010, manufactured by BASF)
(B-2) Triethylene glycol bis(3-tert-butyl-4-hydroxy-5-methylphenyl)propionate (product name: Irganox 245, manufactured by BASF).
(C) Metal compound
(C-1) Magnesium oxide having a specific surface area of 30 $m^2/g$ and an average particle diameter of 0.6 μm (product name: Kyowamag MF30, manufactured by Kyowa Chemical Industry Co., Ltd.).

(C-2) Magnesium oxide having a specific surface area of 135 m²/g and an average particle diameter of 0.9 μm (product name: Kyowamag MF150, manufactured by Kyowa Chemical Industry Co., Ltd.).
(C-3) Magnesium oxide having a surface area of 155 m²/g and an average particle diameter of 7 μm (product name: Kyowamag 150, manufactured by Kyowa Chemical Industry Co., Ltd.).

Measurement of Average Particle Diameter

Measurement of particle distribution was carried out according to a laser diffraction/scattering method, using a laser diffraction/scattering particle diameter distribution measuring apparatus LA-920 manufactured by HORIBA, Ltd., under the following measurement conditions, to find an average diameter (50% d) at cumulative value of 50%.

Measurement Conditions

Circulation speed: 5
Laser light source: 632.8 nm He–Ne laser 1 mW, tungsten lamp 50 W
Detector: ring-shaped 75-segment silicon photodiode×1, silicon photodiode×12
Dispersion medium: distilled water
Supersonic wave: included
Transmission: 75 to 90%
Relative refractive index with respect to water: 1.32
Basis of particle diameter: volume
(D) Polyalkylene glycol
(D-1) Product name: PEG6000S (manufactured by Sanyo Chemical Industries Ltd.)

Examples and Comparative Examples

Respective components indicated in Table 1 were blended and mixed in ratios indicated in Table 1 and melt kneaded in a twin-screw extruder to prepare pellets of the compositions.

Evaluation (1) Evaluation for Resistance against Acidic Cleaner
Using the polyacetal resin compositions prepared in the Examples and the Comparative Examples, tensile test specimens of ISO type 1-A with a thickness of 4 mm were produced by injection molding.

Method of Evaluation

In order to evaluate resistance of the polyacetal resin compositions against acidic cleaners, both ends of each of the tensile test specimens were fixed and bent at a rate of 2.0% of load strain. Then, an acidic cleaner was sprayed on the surface of the tensile test specimen and the tensile test specimen after spraying was left under the condition of 60° C. for 4 hours. Then, the tensile test specimen was left under conditions of 23° C. and 55% RH for 4 hours. Then, the acidic cleaner was sprayed again on the test specimen and the test specimen was left under conditions of 23° C. and 55% RH for 16 hours.

As the acidic cleaner, the following acidic cleaners were used.
Cleaning agents: sulfuric acid: 1.5%, hydrofluoric acid: 1.5%, phosphoric acid: 10%
The surface of the dumbbell test specimen was visually observed for evidence of cracks at the completion of each cycle consisting of spraying an acidic cleaner, leaving the tensile test specimen at 60° C. for 4 hours, leaving the tensile test specimen at 23° C. and 55% RH for 4 hours, spraying the acidic cleaner again and leaving the tensile test specimen at 23° C. for 16 hours. The polyacetal resin compositions were classified into D to A as follows, depending on the number of cycles at which a crack was confirmed.
D: less than 13
C: 13 to less than 16
B: 16 to less than 20
A: 20 or more
(2) Moldability: Mold Deposit
Using the polyacetal resin compositions prepared in the Examples and the Comparative Examples, mold deposit specimens (disk type) were molded under the following conditions.

Method of Evaluation

After 3,000 shots molding, the surface of the cavity member on the movable mold was visually observed, and the amount of attached matter was judged according to the following criteria.
0: no deposits were confirmed
1: deposits were confirmed
2: a large amount of deposits were confirmed.
* Molding machine: FANUC ROBOSHOT Molding machine: FANUC ROBOSHOT S-2000i 50B (Fanuc Corporation)
* Molding conditions: cylinder temperature (° C.), Nozzle-C1-C2-C3:
205, 215, 205, 185° C., respectively
Injection pressure: 40 (MPa)
Injection velocity: 1.5 (m/min.)
Mold temperature: 60 (° C.)
(3) Evaluation of Heat Aging Resistance (Long-Term Heat Resistance)
Using the polyacetal resin compositions prepared in the Examples and the Comparative Examples, test specimens with a thickness of 4 mm of ISO type 1-A were molded and the test specimens were retained in a gear oven (manufactured by Toyo Seiki Co., Ltd.) at 140° C. for 1,000 hours. Then, tensile strength of each of the test specimens was measured according to ISO 527-1, 2 and retention ratio relative to the initial tensile strength (TS) was obtained and the polyacetal resin compositions were rated as being good or bad, as shown below.

Evaluation Method

Bad: TS retention ratio after being retained at 140° C. for 1,000 hrs was less than 80%.
Good: TS retention ratio after being retained at 140° C. for 1,000 hrs was 80% or more.
(4) Evaluation of Tensile Fracture and Distortion
Using the polyacetal resin compositions prepared in the Examples and the Comparative Examples, test specimens with a thickness of 4 mm of ISO type 1-A were molded and measurement of tensile fracture nominal strain was carried out according to ISO 527-1, 2. The polyacetal resin compositions were classified into C to A, as shown below.

Evaluation Method

C: less than 5%
B: 5% to less than 10%
A: 10% or more

TABLE 1

| *Numerical values are given in part(s) by mass | | Example 1 | 2 | 3 | 4 | 5 | 6 | 7 | 8 | 9 | 10 | 11 | 12 | 13 |
|---|---|---|---|---|---|---|---|---|---|---|---|---|---|---|
| (A)Polyacetal copolymer | A-1 | | | | | | | | | | | | | 100 |
| | A-2 | 100 | 100 | 100 | 100 | 100 | 100 | 100 | 100 | 100 | 100 | 100 | 100 | |
| | A-3 | | | | | | | | | | | | | |
| (B)Hindered phenol-based antioxidant | B-1 | 1.2 | 1.2 | 1.2 | 1.2 | 1.2 | 1.2 | 1.5 | 2.0 | 2.0 | 4.5 | 1.2 | | 1.2 |
| | B-2 | | | | | | | | | | | | 1.2 | |
| (C)Magnesium oxide | C-1 | | | | | | 6.0 | | | | | | | |
| | C-2 | 4.5 | 4.5 | 6.0 | 6.0 | | | 10.0 | 25.0 | | 4.5 | 4.5 | 4.5 | 4.5 |
| | C-3 | | | | | 6.0 | | | | 25.0 | | | | |
| (D)Polyalkylene glycol | D-1 | 0.0 | 2.0 | 2.0 | 1.0 | 2.0 | 2.0 | 2.0 | 2.0 | 2.0 | 2.0 | 8.0 | 0.0 | 0.0 |
| Acidic cleaner-resistance | | Δ | ○ | ⊚ | ○ | ⊚ | ○ | ⊚ | ⊚ | ⊚ | ○ | ⊚ | Δ | ○ |
| Mold deposit | | 0 | 0 | 0 | 0 | 0 | 0 | 0 | 0 | 0 | 0 | 0 | 0 | 0 |
| Heat aging resistance | | ○ | ○ | ○ | ○ | ○ | ○ | ○ | ○ | ○ | ○ | ○ | ○ | ○ |
| tensile fracture nominal strain | | ⊚ | ⊚ | ⊚ | ⊚ | ○ | ⊚ | ⊚ | ○ | Δ | ○ | ○ | ⊚ | ⊚ |

TABLE 2

| *Numerical values are given in part(s) by mass | | Comparative Example 1 | 2 | 3 | 4 | 5 | 6 | 7 | 8 | 9 |
|---|---|---|---|---|---|---|---|---|---|---|
| (A)Polyacetal copolymer | A-1 | 100 | | | | | | | | |
| | A-2 | 100 | 100 | 100 | | | | 100 | 100 | 100 |
| | A-3 | | | | 100 | 100 | | | | |
| (B)Hindered phenol-based antioxidant | B-1 | 0.3 | 1.2 | 0.3 | 1.2 | 1.2 | 1.2 | 0.8 | 0.8 | 0.8 |
| | B-2 | | | | | | | | | |
| (C)Magnesium oxide | C-1 | | | | | | | | | |
| | C-2 | 3.0 | 3.0 | 4.5 | 4.5 | 4.5 | 3.0 | 4.5 | 15.0 | 35.0 |
| | C-3 | | | | | | | | | |
| (D)Polyalkylene glycol | D-1 | 2.0 | 2.0 | 2.0 | 0.0 | 2.0 | 0.0 | 2.0 | 2.0 | 2.0 |
| Acidic cleaner-resistance | | X | X | ○ | Δ | ○ | X | ○ | ⊚ | ⊚ |
| Mold deposit | | 0 | 0 | 0 | 2 | 2 | 0 | 0 | 0 | 0 |
| Heat aging resistance | | ○ | ○ | X | X | X | ○ | X | X | X |
| tensile fracture nominal strain | | ⊚ | ⊚ | ⊚ | ⊚ | ⊚ | ⊚ | ⊚ | ○ | Δ |

With respect to the acidic cleaner-resistance, Examples 1 to 13 showed good results: crack occurrence was confirmed at the number of cycles of 13 or more; mold deposits were not generated even at 3,000 shots; and excellent long-term heat resistance was achieved.

Contrary to this, with respect to the acidic cleaner-resistance, Comparative Examples 1, 2, and 6 only achieved poor results in which the number of cycles at which the crack occurs was confirmed to be less than 13. In Comparative Examples 4 and 5, a large amount of mold deposits were generated at 3,000 shots. Comparative Examples 3 to 5 and 7 to 9 exhibited unsatisfactory long-term heat resistance in the heat aging evaluation. Based on the Examples and the Comparative Examples, the inventive product was confirmed to be a polyacetal resin composition having all of excellent acidic cleaner-resistance, mold deposit resistance and long term heat resistance.

The invention claimed is:

1. A polyacetal resin composition, comprising:
    (A) a polyacetal copolymer in an amount of 100 parts by mass, wherein the polyacetal copolymer (A) has a hemiformal end group content of 0.2-0.8 mmol/kg,
    (B) a hindered phenol-based antioxidant selected from the group consisting of compound (B-1) Tetrakis[methylene-3-(3,5-di-t-butyl-4-hydroxyphenyl)propionate methane and compound (B-2) Triethylene glycol bis (3-tert-butyl-4-hydroxy-5-methylphenyl)propionate in an amount of 1.1 parts by mass or more and 2.0 parts by mass or less,
    (C) magnesium oxide in an amount of 6.0 parts by mass or more and 15 parts by mass or less, and
    (D) polyethylene glycol in an amount of 2.0 part by mass or more and 5.0 parts by mass or less,
    wherein a BET specific surface area of magnesium oxide ranges from 100 to 155 $m^2/g$, and an average particle diameter of magnesium oxide is 7.0 μm or less,
    wherein a number average molecular weight of the polyethylene glycol is 1000 or more and less than 9300.

2. An automotive part or motorcycle part comprising a molded product of the polyacetal resin composition according to claim 1.

3. The automotive part or motorcycle part according to claim 2, wherein the automotive part or motorcycle part is a part to be brought into contact with an acidic cleaner.

4. A method for improving acid resistance against an acid component derived from a strongly acidic component, wherein the method comprises using an automobile part or motorcycle part comprising the molded product of the polyacetal resin composition according to claim 1.

5. The method according to claim 4, wherein the acid component is derived from an acidic cleaner.

6. The polyacetal resin composition according to claim 1, wherein the BET specific surface area of the magnesium oxide ranges from 135 to 155 m$^2$/g.

\* \* \* \* \*